July 30, 1968 — TAKAMITSU NAGASATO — 3,394,914
FLUID PRESSURE RESPONSIVE SEALING BUTTERFLY VALVE
Filed July 19, 1965 — 4 Sheets-Sheet 1

INVENTOR
TAKAMITSU NAGASATO

INVENTOR
TAKAMITSU NAGASATO

INVENTOR
TAKAMITSU NAGASATO
*INVENTOR.*

BY McGlew and Toren
*attorneys*

United States Patent Office 3,394,914
Patented July 30, 1968

3,394,914
FLUID PRESSURE RESPONSIVE SEALING BUTTERFLY VALVE
Takamitsu Nagasato, 1171 Kizuki, Kanagawa-ken, Kawasaki-shi, Japan
Filed July 19, 1965, Ser. No. 472,890
7 Claims. (Cl. 251—173)

ABSTRACT OF THE DISCLOSURE

A valve comprised of a valve housing forming a passageway for fluid flow therethrough and a valve closure member disposed within said passageway and rotatable therein between a closed position extending transversely across and sealing the passageway and a plurality of open positions for the passage of fluid flow through the valve. Means extending through the valve housing and secured to the closure member for rotatably positioning the closure member within the passageway in the housing. A continuous groove formed in the inner surface of the housing extending around the passageway and positioned adjacent the outer edge of the closure member when it is located in its closed position. The groove is formed of a first part opening into the passageway and a second part extending outwardly into the housing from the first part, the second part has a cross sectional shape considerably smaller than that of the first part. The groove is disposed in a plane extending through the valve closure member in its closed position and the groove is offset from the means for rotatably positioning the valve closure member. A resilient annular sealing piece is disposed within the groove and comprises a first section secured within the first part of said groove and a second section located on the outer periphery of the first section and tightly secured within the second part of the groove. The inner surface of the first part of the sealing piece extends inwardly into the passageway and contacts the peripheral edge of the closure member in its closed position for affording a fluid tight closure across the passageway through the housing.

Summary of the invention

The present invention relates to improvements in the butterfly valves, particularly to a novel construction of butterfly valves of the type formed integrally in one valve body.

In the conventional types of the butterfly valves, especially of the simplest construction, the leaking of fluid could not be avoided when the valve was closed. Many attempts have been made so as to lessen the leaking of fluid to minimum, by which, however, no effective device has been found to attain the complete prevention of leaking. Particularly the prevention of leaking from the valve stem was almost difficult. Such an attempt for sealing the interspace between the inner wall of the valve housing and the outer periphery of the valve by enclosing them tightly and continuously with the valve shaft was not desirable because the sealing members are exposed always to the flow of fluid during the opening of the valve and thereby the construction of valve is made more complicated by such means. A proposal to provide a construction having a spherical contact between the valve and the valve seat for overcoming the drawback was found impracticable because the structure of the valve is made also complicated. It was noted that no simple and reliable construction was found for the manufacture of this type of butterfly valve.

Principal object of the present invention is to eliminate the above-mentioned drawback and to offer the butterfly valves simple in construction, efficient in operation as well as effecting economy in use of materials in much wider range of application.

With this object in view, the present invention is to provide a butterfly valve comprising a relatively flexible solid or hollow annular piece adhering for sealing a free interspace between a valve housing and an outer periphery of a valve body, said annular piece having a main portion of an approximately circular cross section and a flanged or projected rim extending all along the outer periphery of said annular piece, and said annular piece being held between the split part of the valve housing in parallel or diagonally relative to the valve shaft, the main portion of said annular piece being fitted into an endless groove provided along the inner periphery of the valve housing, so that upon closing the valve the inner periphery of said annular piece is adhered to all outer periphery of the valve body endlessly so as to seal the free interspace tightly between the outer periphery of the valve body and the valve housing.

The invention will now be illustrated more fully by way of example according to embodiments with reference to the drawings, in which:

FIGURES 1–5 show the first example of embodiment of the butterfly valve according to this invention; in which FIGURE 1 is a vertical cross sectional view showing the butterfly valve in closed condition;

FIGURE 2 is a front elevation of the valve in opened condition;

FIGURE 3 is a cross sectional plan view of the valve in closed condition;

FIGURE 4 is a front elevation of the valve taken along the line A—A' on FIGURE 2;

FIGURE 5 is an exaggerated cross sectional view of the valve showing operation of the main part of the valve;

FIGURES 6 and 7 show the second example of embodiment according to the present invention; in which FIGURE 6 is a vertical cross section of the valve showing parts excluding the valve operating mechanism.

FIGURE 7 is a cross sectional plan view of the valve in FIGURE 7 wherein the valve body shows its outer appearance and the annular piece is fitted in the groove;

FIGURES 9 to 12 show other embodiments of hollow annular pieces of this invention; in which:

FIGURE 9 shows a partially enlarged cross section of the hollow annular piece into which pressure fluid has been introduced;

FIGURE 10 is a perspective view of the hollow annular piece;

FIGURE 11 is a perspective view of the proximity of a pressure inlet for the annular piece into which various pressure fluids are introduced from outside of the housing of valve;

FIGURE 12 is an enlarged view of the main part at the inlet of the pressure fluid;

FIGURES 13 to 15 show the third embodiment of this invention, in which:

FIGURE 13 is a vertical cross section of the valve excluding the valve operating mechanism;

FIGURE 14 is a perspective view of the valve body; and

FIGURE 15 shows an enlarged cross section of the main part of the valve according to this invention particularly showing the embodiment in which a corrosion resistant valve is applied.

Figure 5:
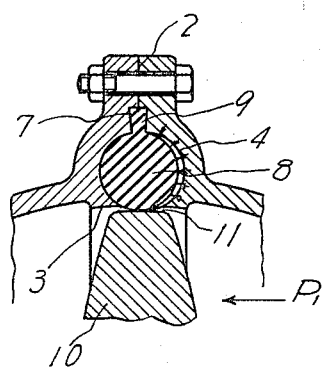

Referring now to the drawings and particularly FIGURES 1 to 5, numeral 1 denotes a valve housing which consists of a housing 1a, 1b divided by a plane 2 crossing the centre of the valve at a given angle. 3 is a valve seat, the inside of which is preferably formed into a sperical surface for this invention different from the conventional type of butterfly valves taking ordinarily a cylindrical shape. 4 is a groove internally provided along the inner periphery of the valve seat 3. The groove 4 in this embodiment runs along the plane 2 and on the housing 1a, 1b except on the shaft 5, 6. All along the outer periphery of the housing there is provided a flanged groove 7 between 1a and 1b. 8 is an annular piece having almost identical cross section with said grooves 4 and 7. A greater portion of the piece 8 is fitted into the groove 4 and a portion of its inner periphery is projected inwardly and the flanged portion 9 along the outer periphery is fitted to said flanged groove 7 on the plane 2 between 1a and 1b of the housing. Thus the annular piece 8 is fixed securely and prevented from falling off the groove. The flanged part 9 serves as a packing for sealing to prevent the leaking of pressure from between the housing 1a, 1b on the plane 2. The annular piece 8 has a cross section of a full circle as shown in FIGURE 5 but it may take any modifications and be preferred for the particular use as the case may be as later explained in detail.

10 is a vale body, the outer periphery of which takes a spherical form 11. Upon the valve being closed the shoulders 10' and 10" closely contact the inner pheriphery of the annular piece 8 so as to tightly seal the leaking part. 12 is a valve stem supported at the stem part 5 and 6 of the housing 1a, 1b.

13 and 14 are controlling means mounted on a frame 15 of the housing 1a and having worm gears employed usually for the valves of the larger type. For the smaller type of valves these gears may be omitted, instead there is employed a lever or a handle directly or a fixing means for the lever or a handle with a given angle of turning. 16 is a stopper fixed on the valve shaft 12 and 17 is a handle.

Figure 1:
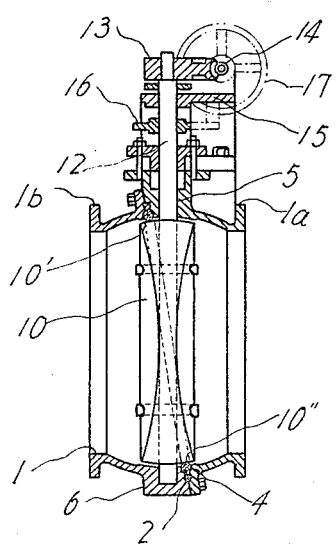
Figure 2:
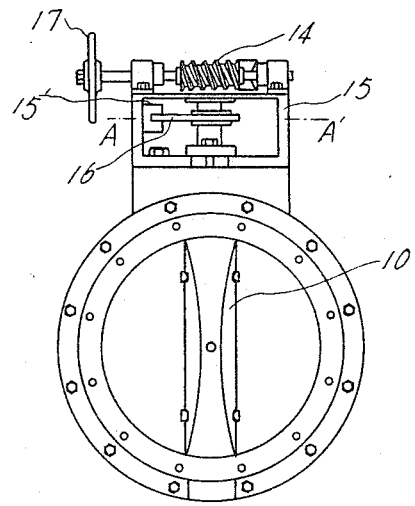
Figure 3:
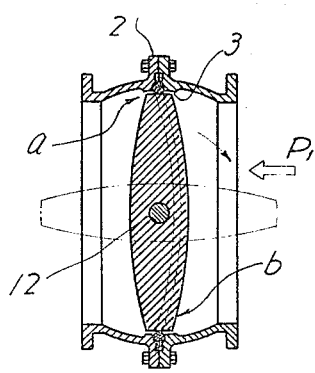
Figure 4:
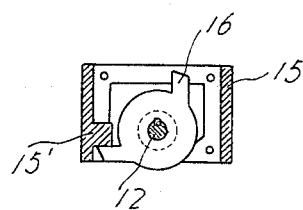
Figure 8:
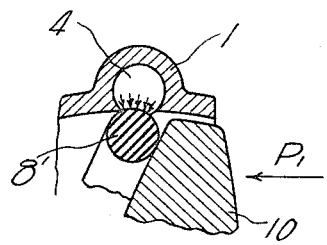
FIGURE 8 shows a condition of the annular piece of a valve according to other examples of invention.

The operation of the valve according to this embodiment will now be illustrated, which is almost identical with that of the conventional valves. Upon turning the handle 17 either to the left or the right the valve body 10 revolves either to the right or the left by the turn of the valve shaft resulting in the closing or opening of the valve. It should be noted however that apart from the conventional valves the valve of this invention closes nearly by an angle of 90 degrees from complete opening as seen in FIGURES 1 and 3. For keeping the position of full opening and closing of the valve body 10, the stopper 16 is restricted of its revolution within a proper range by means of a projection 15' of the frame 15. During the closing of the valve body 10 shown in FIGURES 1 and 3 the annular piece 8 fitted into the groove 4 and 7 of the housing 1a, 1b will have the inner diameter smaller than the outer diameter of the valve body 10 appreciably so that the annular piece 8 adheres the outer periphery of the valve body due to compression. Therefore the inner pressure generated on the high pressure side in any appreciable degree will act on one-half of the face of the annular piece 8 on the high pressure side, pressing then the piece 8 against the inner wall of the groove 4 toward the low pressure side, compresses the annular piece 8 to its centre part inwardly and fastens the outer periphery of the valve body 10, thus causing stronger adhesion of the annular piece to the valve body 10. This action which is identical with that of O-ring will close the leaking part tightly and prevent the leaking of fluid therefrom. In case the annular piece 8 has no flanged portion 9 and 8', the fluid pressure P1 will act on all back face of the valve body working over the centre of the annular piece 8' up to the low pressure side. Therefore when the valve is about to open, the valve body 10 is separated from the annular piece 8' and the fluid begins to leak, at the position of which, i.e., at a or b in the figure the annular piece 8' receives back pressure P1' at its back surface so that when the valve body leaves from the annular piece 8, the piece is pushed out of the groove 4 as shown in FIGURE 8.

In the present invention the flange 9 of the annular piece 8 does not cause back pressure P1' as mentioned above, but the flange is retained in the groove 7 and held there between being fixed to the housing 1a, 1b. In any case the annular piece 8 does not fall off the groove 4. Further the flange 9 seals the leaking of pressure from between the housing 1a, 1b on the plane 2 so that it is possible to dispense with a packing on this part.

Figure 6:
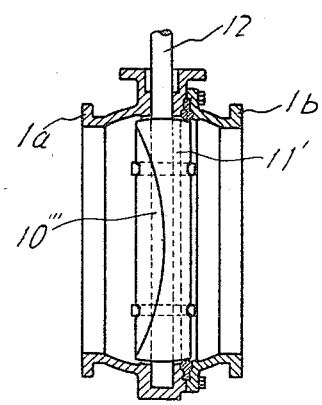
Figure 7:
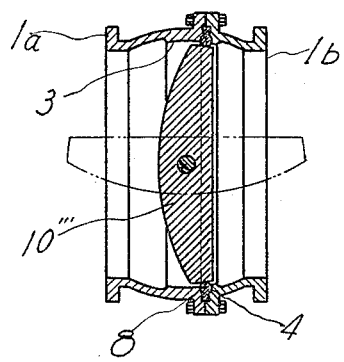

Describing now about the second example of embodiment with reference to FIGURES 6 and 7, it is seen that the groove 4 of the housing 1a, 1b can be provided on one part of the valve shaft almost in parallel with the axis and at a position adjacent thereto and the annular piece 8 is retained in the groove 4 so that the outer periphery 11' of the valve body 10" and the inner periphery of the annular piece contacts the other side of the axis of the valve body 10" tightly and in parallel therewith. The valve body 10" in its cross section at right angles to the shaft takes an arcuate form unsymmetrically with the axis. The manner of operation of the valve is common with both the first and the second embodiments. There is a difference that the former form is better adapted for the flow quantity regulating valve particularly when the fluid is liquid. In the manufacture, the latter type is a little easier than the former.

Figure 9:
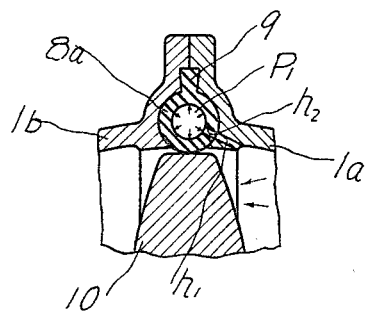
Figure 10:
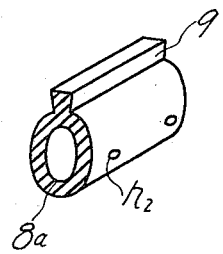
Figure 11:
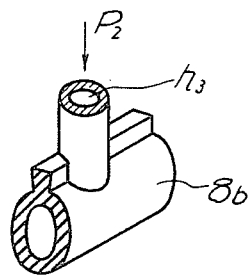
Figure 12:
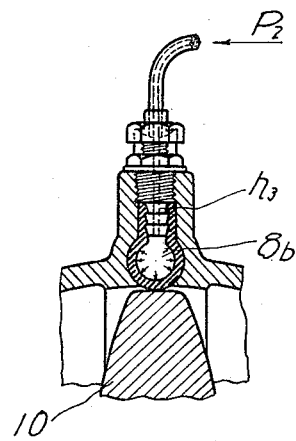

Illustrating now various embodiments of types of the annular piece 8 with reference to the drawings, in which FIGURE 9 shows the main body of the annular piece 8a which is almost circular and hollow and has a flange of a wedge-like cross section. The fluid pressure P1 in the valve body is introduced into the annular piece 8a through a hole h1 and a hole h2 provided at the adequate position of the annular piece 8a. When the valve closes, the annular piece 8a is expanded from inside by force of fluid pressure P1 and seals compactly the part of leaking. This arrangement is most suitable when the fluid pressure is somewhat higher than normal. FIGURE 10 shows the condition of the annular piece 8a in the same case. FIG. 11 shows the annular piece 8b of a circular hollow cross section as in FIGURE 10 in which other fluid pressure P2 than P1 is flowed from outside. This type has an inlet for outer fluid pressure h3 at some adequate position. Equipment of said annular piece 8b is shown in FIGURE 12 in which the outer fluid pressure P2 can be introduced by a pump held by the valve itself or by other method such as through a three-way cock of waterway, pressure oil, and air compression systems. According to this method the inner pressure P2 except in case the valve is closed is exhausted totally or partially, then the annular piece 8b contracts to remove the friction of the outer periphery 11 of the valve body 10. This type is therefore suitable for a large and high pressure valve.

Figure 13:
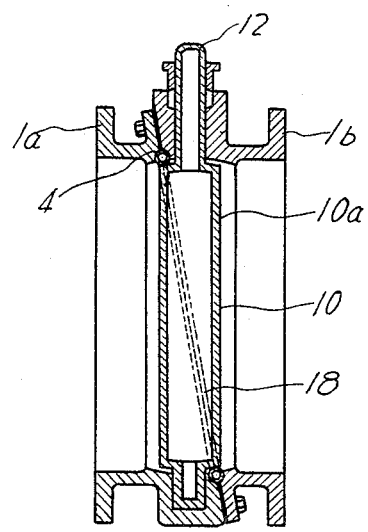
Figure 14:
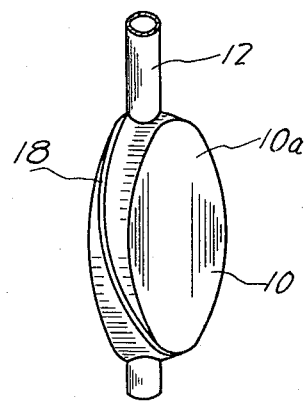
Figure 15:
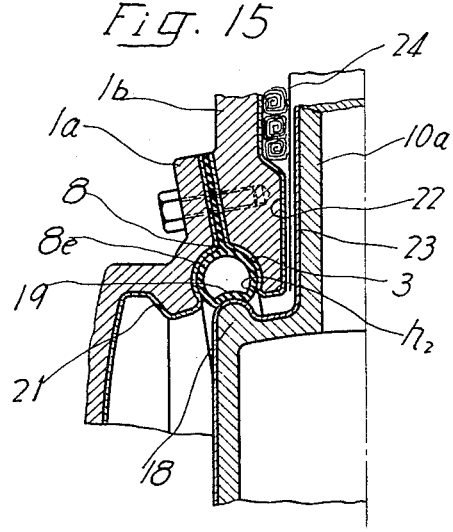

The third embodiment will now be illustrated with reference to the FIGURES 13 to 15. The device of this embodiment is arranged to adapt particularly for a corrosion resistant valve needed of coating with adequate material all over the part in contact with the fluid of the valve. In the manufacture thereof the valve body 10 and the valve shaft 12 may desirably be built in one body, accordingly the valve body 10 and the valve shaft 12 are formed into an integral valve with shaft 10a.

The construction of the groove 4 of the housing 1a, 1b follows similarly the example of the first embodiment. The difference from the first embodiment is that there is provided a ring elevation 18 continuously extended on the outer periphery of the valve with shaft 10a at a proper position thereon and in a certain inclination to its axis enclosing the axis within the ring. 8a shows its example. There is provided a recess 19 in which the ring elevation 18 is fitted when the valve body 10a comes to a closing position on the part of the hollow cross section of the annular piece 8 in response to the movement of the ring elevation 18. In this case too the annular piece 8 and the valve body 10 may take one of the above-mentioned forms. 21, 22, and 23 are the coated portions on the housing 1a, 1b and the valve body 10a. 24 is a separating piece inserted between the revolving parts of the coated portions. This embodiment shows also one of the systems to ensure the working of the fluid in the annular piece 8e and adhering it to the valve body 10a.

In this type of corrosion resistant valves the valve takes usually the form common with the sluice valve or the stop valve for the medium and large size valves, but these types are not suitable for the application of corrosion resistant coatings so that the whole valve is made as for example of hard lead or high grade stainless steel.

The butterfly valves of this invention have a construction suitable for such corrosion resistant coating, therefore it is quite possible to provide an economical and easily operated valve by applying such coatings. With the annular piece as main constituent which is easy for replacement, the present invention can attain a much more simple construction and exact operation as well as easy manufacture serving also as a check valve and a control valve.

What I claim is:

1. A valve comprising a valve housing forming a passageway for fluid flow therethrough, said valve housing divided by a plane disposed transversely to the axis of the passageway therethrough into a first section and a second section, means for securing said first and second sections together, a valve closure member arranged within the passageway in said housing and rotatably positionable therein between a closed position wherein the closure member extends transversely across the passageway blocking flow therethrough and a plurality of opened positions for admitting fluid flow through the passageway, means for rotatably positioning said valve closure member within said passageway, a continuous groove formed in the inner surface of said housing extending around said passageway and positioned adjacent the outer edge of said closure member in its closed position, said groove disposed in the plane separating said first and second sections of said housing and located in part in the first section and in part in the second section, said groove formed of a first part directed inwardly toward and opening into the passageway in said housing and a second part spaced from the passageway and extending outwardly from said first part into said housing, said groove having a curvilinear surface in its first part and a rectilinear surface in its second part, said second part having a cross sectional area considerably smaller than that of said first part, said groove disposed in the plane of the valve closure member in its closed position and offset from said means for rotatably positioning the valve closure member, and a resilient annular sealing piece disposed within said groove and comprising a first section having a generally O ring shape and secured loosely within the first part of said groove and a second section located on and extending outwardly from the outer periphery of said first section of said sealing piece having a shape similar to the cross section of said second part of said groove and tightly secured within said second part, the inner surface of the first section of said sealing piece extending inwardly into said passageway and contacting the peripheral edge of said closure member in its closed position in fluid sealing relationship therewith, whereby with the closure member in the closed position the fluid within the passageway exerts a force against the O ring shape of the first section of said annular sealing piece which is loosely fitted within the first part of said groove and increases the sealing effect with said closure member while with the closure member in its opened position the second section of said sealing piece securely holds said sealing piece in place though the first section is only loosely fitted within said groove.

2. A valve, as set forth in claim 1, wherein the sides of the second section of said sealing piece extending outwardly from the first section are arranged in outwardly diverging relationship affording a dove-tailed shaped section, and the second part of said groove has a shape similar to the dove-tailed shaped section of the second section of said sealing piece for tightly securing said sealing piece within the joint between the first and second sections of said valve housing.

3. A valve, as set forth in claim 1, wherein the plane extending through said groove is angularly disposed with respect to a plane extending perpendicularly to the axis of the passageway through said housing and also extending through the means for rotatably positioning said closure member.

4. A valve, as set forth in claim 1, wherein the plane of said groove is disposed in parallel relationship with and spaced from a plane extending transversely across said housing and disposed perpendicularly to the axis of the passageway therethrough and also extending through the means for rotatably positioning said closure member and through said closure member.

5. A valve, as set forth in claim 1, wherein the means for rotatably positioning the closure member are integrally secured to it, and a protuberance is formed on and extends outwardly from the peripheral edge of the closure member disposed in the same plane as the plane of said groove and is arranged to engage said sealing piece for forming a fluid seal within the passageway through said housing when said closure member is located in its closed position.

6. A valve as set forth in claim 1, wherein said first section of said sealing piece is hollow.

7. A valve as set forth in claim 6, wherein tubular connections are secured to the outer surface of said sealing piece for forming a passageway into the hollow first section of said sealing member.

References Cited

UNITED STATES PATENTS

| | | | |
|---|---|---|---|
| Re. 23,613 | 1/1953 | Danks | 251—305 |
| 1,813,126 | 7/1931 | Sheppard | 251—173 |
| 2,081,842 | 5/1937 | Sharp | 251—173 |
| 3,073,336 | 1/1963 | Johson | 137—375 |
| 3,076,631 | 2/1963 | Grove | 251—173 |
| 3,080,145 | 3/1963 | Swain | 251—306 |
| 3,159,377 | 12/1964 | Samour | 137—375 X |
| 1,826,941 | 10/1931 | La Mont | 137—246.22 X |

FOREIGN PATENTS 245,650  1/1926  Great Britain.

CLARENCE R. GORDON, *Primary Examiner.*